(No Model.)

G. W. STEWART.
BEARING FOR CAR AXLE JOURNALS.

No. 291,547. Patented Jan. 8, 1884.

Witnesses:
B. C. Fenwick
Robt. L. Fenwick

Inventor:
George W. Stewart
by his attys.
Fenwick & Lawrence

UNITED STATES PATENT OFFICE.

GEORGE W. STEWART, OF ATLANTA, GEORGIA, ASSIGNOR, BY DIRECT AND MESNE ASSIGNMENTS, TO EDMUND HOLLAND, OF SAME PLACE, GUSTAVUS G. LANSING, OF NEW YORK, N. Y., THEOPHILUS P. BROWN, OF TOLEDO, OHIO, AND GEO. W. SMITH, OF LAFAYETTE, INDIANA.

BEARING FOR CAR-AXLE JOURNALS.

SPECIFICATION forming part of Letters Patent No. 291,547, dated January 8, 1884.

Application filed May 29, 1883. (No model.)

*To all whom it may concern:*

Be it known that I, GEORGE W. STEWART, a citizen of the United States, residing at Atlanta, in the county of Fulton and State of Georgia, have invented a new and useful Improvement in Bearings for Car-Axle Journals, of which the following is a specification.

Figure 2:
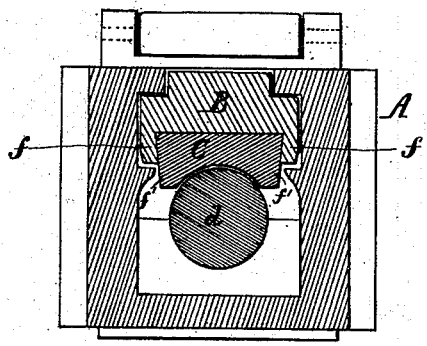
Figure 1:
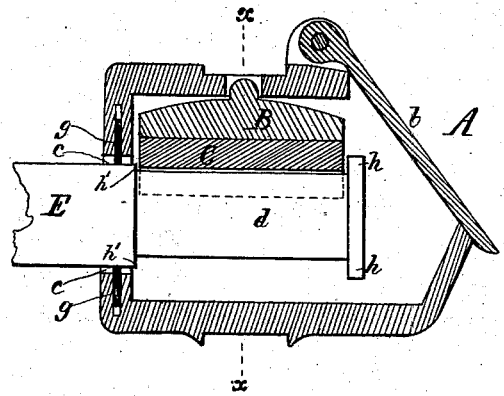
Figure 3:
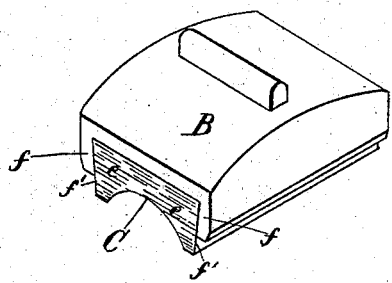

In the drawings hereto annexed and forming a part of this my specification of said invention, Figure 1 is a central vertical longitudinal section of a car journal-box, showing the journal of a car-axle, a "bearing-box," and "bearing" in normal position therein. Fig. 2 is a cross-section in the line $x$ $x$ of Fig. 1, a hinged end portion of the cover of the box being shown in elevation; and Fig. 3 is a perspective view of the bearing-box, and with my improved journal-bearing inserted therein.

The object of my invention is the production of an inexpensive but durable bearing for the journals of a car-axle, and the providing of means for holding such bearing in working position.

In the drawings, A indicates a car journal-box, provided with the usual lid, $b$, and an opening, $c$, through which to insert the journal $d$ of a car-axle, E, into said box, as shown in Figs. 1 and 2.

B represents the metal bearing box or shoe, into which my improved bearing C is inserted, the bearing-box B being provided with projections, as at $ff$, to fit upon the oblique sides $f'$ $f'$ of the bearing C, and thus hold the bearing in place against sidewise displacement when inserted in the box B, as shown, while the flange $h$ and shoulder $h'$, provided on the journal $d$, serve to prevent the endwise displacement of the bearing C. As indicated in Fig. 1, the box A is provided with a proper packing, as at $g$, to prevent dust from entering the box.

Having described means suitable for holding in place my improved bearing for the journals of car-axles against sidewise and endwise displacement when in use, I will now proceed to describe the bearing C, which constitutes the main element of my invention.

The material used for the construction of the bearing is wood, and I thus avoid the expense attending the use of brass bearings now ordinarily employed. I first cut a wooden bearing, C, of a shape shown in the figures, but of greater dimensions, except as to length, than will be required for the bearing when finished. In forming the bearing, I so cut it from a piece of wood that the grain of the wood shall extend from side to side of the bearing, instead of longitudinally thereof, so that when in use the journal $d$ will be at right angles to the grain $e$. (Represented in short lines in Fig. 3.) I thus, in this particular, form my improved bearing, in order to assist in preventing the lamination of the wood under the motion of the car. I then boil the bearing in linseed-oil for about three hours; but before so doing the bearing may be thoroughly steamed in order to expel the sap from the wood. Having so done, I now, in any proper manner, impregnate the bearing with a solution of silicate of soda, borax, or other non-conducting substance, and I then subject the bearing to a pressure sufficient to compress it to the desired thickness for use, and at the same time impart to it great density and strength, as well as enable it to resist the lamination of the wood by the motion of the car. In this manner I am enabled to produce a bearing for axle-journals which, while it is in a measure self-lubricating, will also endure great wear, and which, when too much worn, can readily be removed from its box and another one supplied in its place, the expense of the same being very much less than the cost of those now in common use. I would here state that the boiling of the bearing in linseed-oil, as well as the impregnation thereof with the silicate of soda, or other non-conducting material, each has the effect of solidifying the wood of which the bearing is made; and, further, that the bearing is thus rendered in a measure self-lubricating, while at the same time the non-conducting substance to which the bearing is treated prevents the bearing from becoming ignited during its use. The bearing-box B, being made of metal, itself serves to conduct off heat from the wooden bearing, and thus assists to prevent the ignition of the bearing in the act of use.

What I claim as my invention, and desire to secure by Letters Patent, is—

1. The non-conducting condensed wood bearing for axle-journals, in combination with a metal journal bearing and sustaining box, substantially as and for the purpose described.

2. The combination of the wood bearing C with a metal bearing-box, B, provided with projections $ff$, substantially as and for the purpose described.

GEORGE W. STEWART.

Witnesses:
JOHN T. ARMS,
B. C. FENWICK.